N. W. CUMMINS.
LUBRICATOR.
APPLICATION FILED MAR. 12, 1914.
1,129,648.
Patented Feb. 23, 1915.
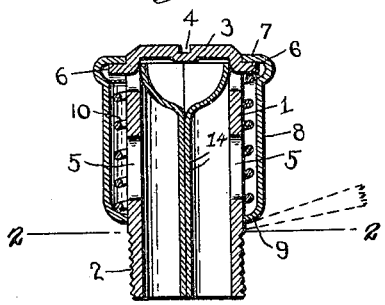
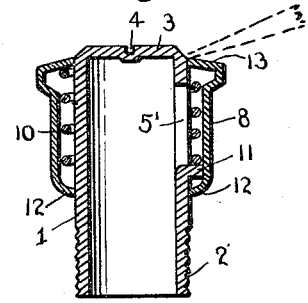
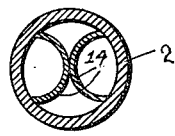
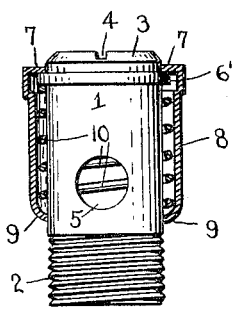
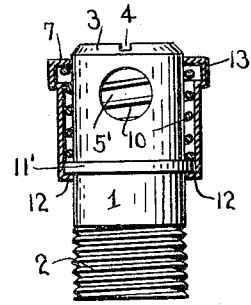
Witnesses
Inventor
Norman W. Cummins,
By
Attorney

UNITED STATES PATENT OFFICE.

NORMAN W. CUMMINS, OF BRIDGEPORT, CONNECTICUT, ASSIGNOR TO THE BURNS & BASSICK COMPANY, OF BRIDGEPORT, CONNECTICUT, A CORPORATION OF CONNECTICUT.

LUBRICATOR.

1,129,648.  Specification of Letters Patent.  Patented Feb. 23, 1915.

Application filed March 12, 1914. Serial No. 824,172.

*To all whom it may concern:*

Be it known that I, NORMAN W. CUMMINS, a citizen of the United States, residing in the city of Bridgeport, county of Fairfield, State of Connecticut, have invented certain new and useful Improvements in Lubricators; and I do declare the following to be a full, clear, and exact description of the invention, such as will enable others skilled in the art to which it appertains to make and use the same.

This invention relates to certain new and useful improvements in lubricators, and aims to provide a dust proof article of this description, so constructed that the supplying of lubricating material is facilitated.

In some instances it is desirable to have a lubricator which while dust-proof, still possesses an unobstructed oil-way or passage on the interior, and it is with this object in view that the present invention has been devised.

While the invention is particularly designed to attain the object aforementioned, still, it will be later evidenced that the invention is also susceptible of having means incorporated therein for preventing communication between the several oil inlets which latter are provided in the lubricator for the introduction of oil.

In the drawings: Figure 1 is a vertical sectional view of the invention, in which the partitions that prevent communication between the oil inlets are shown in position; Fig. 2 is a section on the line 2—2 of Fig. 1; Fig. 3 is a view similar to Fig. 1, of a modified form of the invention; and Figs. 4 and 5, are views similar to Fig. 1, and Fig. 3, of slightly modified forms of the invention, illustrated respectively in said figures.

The invention includes a tubular stem or body 1, threaded at its lower end at 2 to enable attachment to the part to be lubricated, and having its upper or outer end closed as indicated at 3, the top thus formed being provided with a diametrically extending depression 4 to enable a screw driver to be employed in effecting securement of the stem to the part to be lubricated. The stem has a pair of diametrically opposed oil inlet openings 5, though obviously a greater or less number of such openings may be provided as desired. The stem 1, in the form of the invention depicted in Fig. 1, of the drawings, has outwardly extending shoulder 6, which is integral with the body and provides an abutment or stop for the inturned annular end 7 of a sleeve 8 which latter slides longitudinally of the stem or body 1. The shoulder is shown in Fig. 1 as being formed by scarfing the stem and bending the material outwardly. The lower end of the sleeve 8, is inturned at 9 to provide a guide for the sliding movements of the sleeve relative to the stem or body 1, and to also provide a seat for the lower end of a coil spring 10 which latter encircles the stem or body and has its upper end engaged with the abutment or shoulder 6. In Fig. 4 of the drawings, the same structure is provided with the exception of the manner of forming the shoulder 6, which latter is designated 6', and is formed by placing and rigidly securing a separate collar on the stem or body the manner of securement being immaterial as long as the collar is rigidly held upon the stem.

In the form of the invention shown in Fig. 3, of the drawings, a shoulder 11, is formed by scarfing the body and bending the scarfed portion outwardly to form a shoulder 11, which shoulder is located intermediate the ends of the body, at about the center thereof, as shown in said Fig. 3. The sleeve 8 in this form of the invention has the lower inturned end 12 thereof acting against the shoulder 11 so as to limit the outward sliding movement of the sleeve, while the upper inturned end 13 of the sleeve acts as an abutment for the upper end of the coil spring 10.

In Fig. 5 of the drawings, the parts are identical with those shown in Fig. 3, excepting that the shoulder is here shown in the form of a separate collar 11' which may be secured about the periphery of the stem 1, in any suitable manner.

In both Figs. 3 and 5, the oil inlets are designated 5' and are located nearer the top of the body, than are the oil inlets illustrated in Figs. 1 and 2, due to the fact that in operation, the spout C of the oil can is placed on the upper face of the inturned upper end 13, and moves the sleeve 8 downwardly against the action of the coil spring 10, whereas in Figs. 1 and 4 of the drawings, the spout of the oil can is placed on or against the under face of the inturned lower end 9 of the sleeve 8, and moves the sleeve upwardly against the action of the coil spring 10. The partitions, which are shown in the application above identified, are designated 14 in the drawings, and act to prevent communication between the two oil inlets when oil is being injected into the body. The form and manner of securement of these partitions is immaterial, so long as they are effective for performing the function required thereof, the illustration of the partitions in Fig. 1, being merely for the purpose of indicating that the subject matter of the present invention is capable of use in cases where the presence of the partitions is desirable.

From the above it will be apparent that the entire structure as regards the sealing means is located exteriorly of the body or stem of the lubricator, leaving the exterior of the body unobstructed and free of any projections or other parts which may be in connection with or relate to the sealing means. It will further be noted that the spring is confined between the exterior of the body and the sleeve and is protected accordingly.

What is claimed is:

A lubricator, comprising a hollow stem member having a shoulder thereon and provided with a lateral opening and a wrench-hold portion, a sleeve member open at both ends surrounding the stem member and having an abutment at each end and adapted to cover and uncover said opening, and a spring interposed between the shoulder on the stem and one of the abutments on the sleeve member.

In testimony whereof I affix my signature in presence of two witnesses.

NORMAN W. CUMMINS.

Witnesses:
W. B. MORRILL,
A. E. BELISLE.

Copies of this patent may be obtained for five cents each, by addressing the "Commissioner of Patents, Washington, D. C."